(12) United States Patent
Coblentz

(10) Patent No.: US 6,375,407 B1
(45) Date of Patent: Apr. 23, 2002

(54) METHOD AND APPARATUS FOR HANDLING, TRANSPORTING, PALLET REMOVAL AND LOADING CARTONS OF FROZEN ANIMAL PRODUCTS ONTO VESSELS

(75) Inventor: W. Sam Coblentz, Germantown, TN (US)

(73) Assignee: Stevedoring Services of America, Inc., Seattle, WA (US)

( * ) Notice: Subject to any disclaimer, the term of this patent is extended or adjusted under 35 U.S.C. 154(b) by 0 days.

(21) Appl. No.: 09/656,496

(22) Filed: Sep. 7, 2000

Related U.S. Application Data

(63) Continuation of application No. 09/303,792, filed on Apr. 30, 1999, now abandoned, which is a continuation-in-part of application No. 09/093,461, filed on Jun. 8, 1998, now Pat. No. 5,980,198.

(51) Int. Cl.[7] .............................................. B65G 67/08
(52) U.S. Cl. ...................................................... 414/803
(58) Field of Search ............................. 414/803, 142.8, 414/142.7, 143.2

(56) References Cited

U.S. PATENT DOCUMENTS

| 260,924 A | 7/1882 | Bacci ....................... 414/143.2 |
| 1,522,707 A | 1/1925 | Andrews et al. .......... 414/141.6 |
| 1,808,873 A | 6/1931 | Weeks ......................... 414/803 |
| 1,939,037 A * | 12/1933 | Bogert ..................... 414/142.7 |
| 2,509,023 A | 5/1950 | Vogel et al. ............... 214/65.2 |
| 2,671,571 A | 3/1954 | Gerhardt ..................... 214/653 |
| 2,782,066 A | 2/1957 | Lord ............................ 294/99 |
| 2,890,807 A | 6/1959 | Parcell ....................... 214/653 |
| 2,988,036 A | 6/1961 | Mooneyhan et al. .... 414/142.8 |
| 3,332,716 A * | 7/1967 | Gridley .................... 414/142.7 |
| 3,370,880 A | 2/1968 | Carliss et al. ................ 294/87 |
| 3,433,376 A | 3/1969 | Jordan ........................ 214/653 |
| 3,687,300 A | 8/1972 | Andersson ................. 214/1 Q |
| 3,946,880 A | 3/1976 | Schmitt .................... 214/8.5 R |
| 3,971,584 A | 7/1976 | Duncan ........................ 294/88 |
| 4,124,126 A | 11/1978 | Abraham ................... 214/1 Q |
| 4,160,617 A | 7/1979 | Montgomery et al. ...... 414/139 |
| 4,185,944 A * | 1/1980 | Seaberg ....................... 414/621 |
| 4,279,564 A | 7/1981 | Weinert ....................... 414/621 |
| 4,543,035 A | 9/1985 | Lair ............................ 414/786 |
| 4,556,359 A | 12/1985 | Sinclair ....................... 414/621 |
| 4,619,579 A | 10/1986 | Frison ......................... 414/607 |
| 4,642,020 A | 2/1987 | Sinclair ....................... 414/621 |
| 4,660,404 A | 4/1987 | Rugh et al. ................... 72/446 |

(List continued on next page.)

*Primary Examiner*—Douglas Hess
(74) *Attorney, Agent, or Firm*—Dorsey & Whitney LLP

(57) ABSTRACT

A method for rapid transportation and loading of stacks of cartons aboard vessels is provided which may include the mounting of slings about the stacks of cartons, transporting the cartons to the dock using a flatbed vehicle, hoisting the stacks of cartons off the flatbed vehicle and into the hold, depositing the cargo onto a landing pad, lifting the cargo off the landing pad with a lift truck, preferably a load push type lift truck, and depositing the cargo in the hold at the appropriate location. A sling pallet and a landing pad for use with the method are also disclosed. The method provides the advantages of improving the quality of the product by, inter alia, reducing the risk of thawing or spoilage, reducing costs by eliminating labor, eliminating the need to remove pallets and debris from within the vessel, reducing the likelihood of injury to workers, saving demurrage charges and speeding the transportation to and loading of the vessel. A rotator may be used to facilitate the removal of pallets and the installation of slings about stacks of cartons, and stacks of cartons may be lifted directly out of the rotator and into the hold of a ship by the slings using, for example, the ship's gear.

14 Claims, 5 Drawing Sheets

U.S. PATENT DOCUMENTS

| | | | |
|---|---|---|---|
| 4,737,069 A | 4/1988 | Coblentz | 414/786 |
| 4,752,179 A | 6/1988 | Seaberg | 414/607 |
| 4,850,283 A | 7/1989 | Carvin | 108/51.1 |
| 4,890,973 A | 1/1990 | Frison et al. | 414/607 |
| 4,972,782 A | 11/1990 | Shepherd et al. | 108/52.1 |
| 5,161,934 A | 11/1992 | Richardson | 414/621 |
| 5,209,629 A | 5/1993 | Rasmussen | 414/772 |
| 5,567,112 A | 10/1996 | Balzano | 414/786 |
| 5,647,725 A | 7/1997 | Kraus et al. | 414/799 |
| 5,980,198 A * | 11/1999 | Coblentz | 414/803 |

* cited by examiner

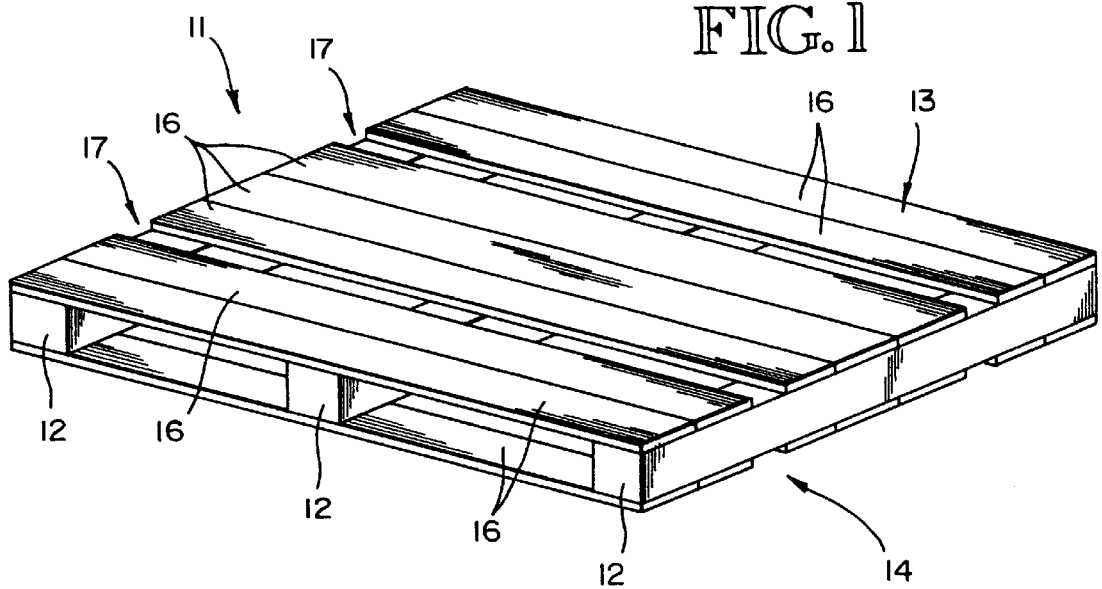
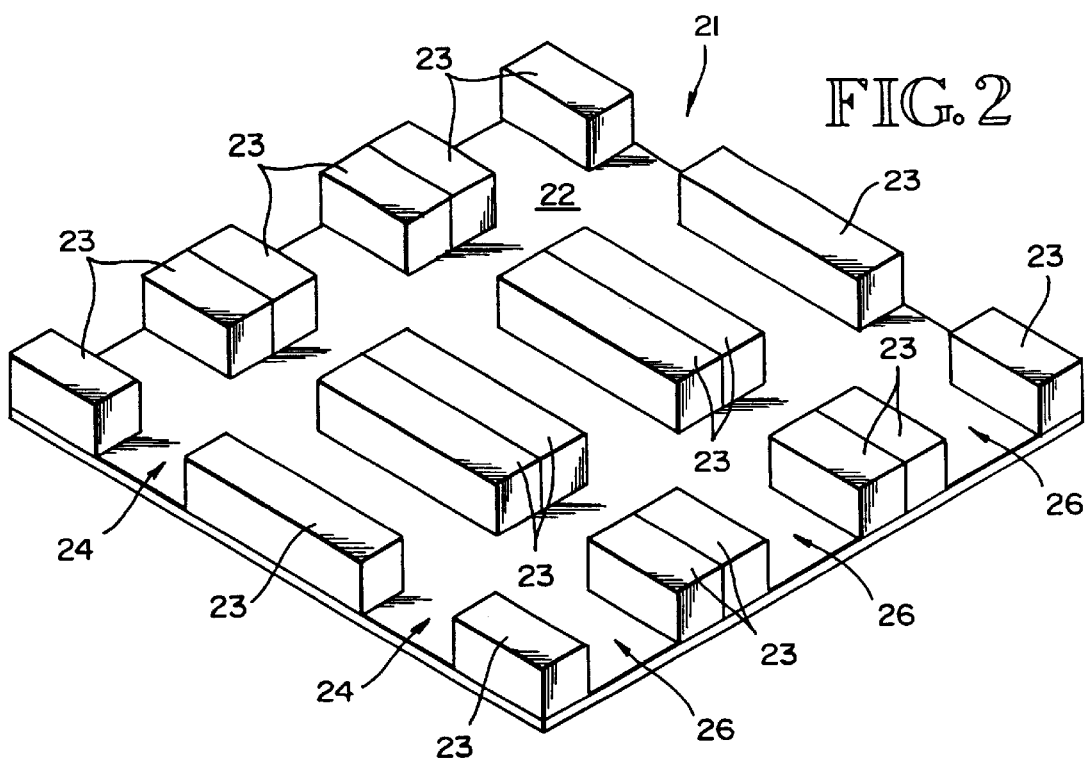

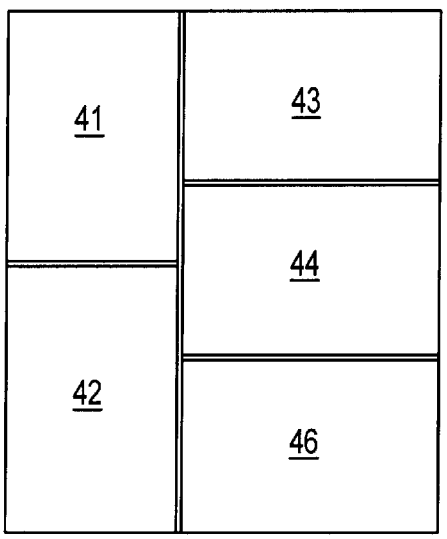
FIG.4
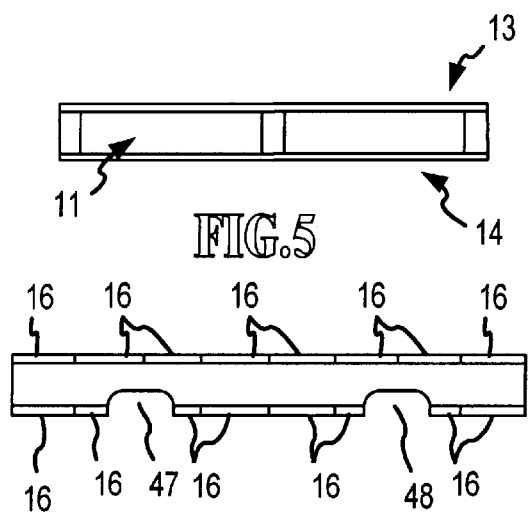
FIG.5
FIG.6
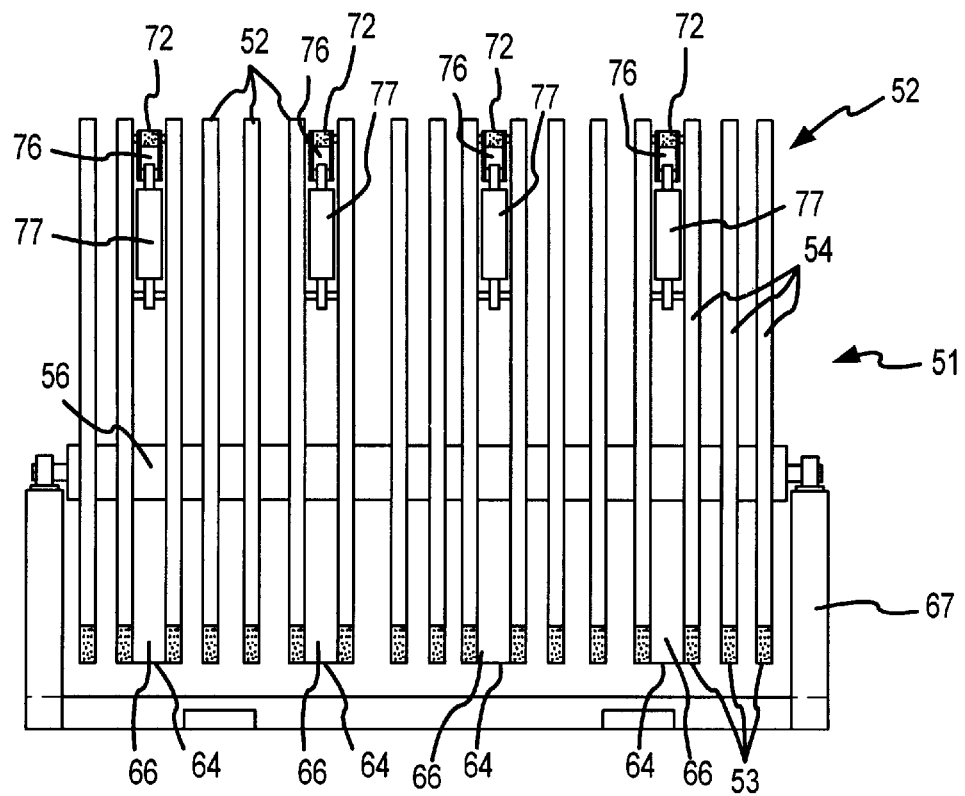
FIG.7

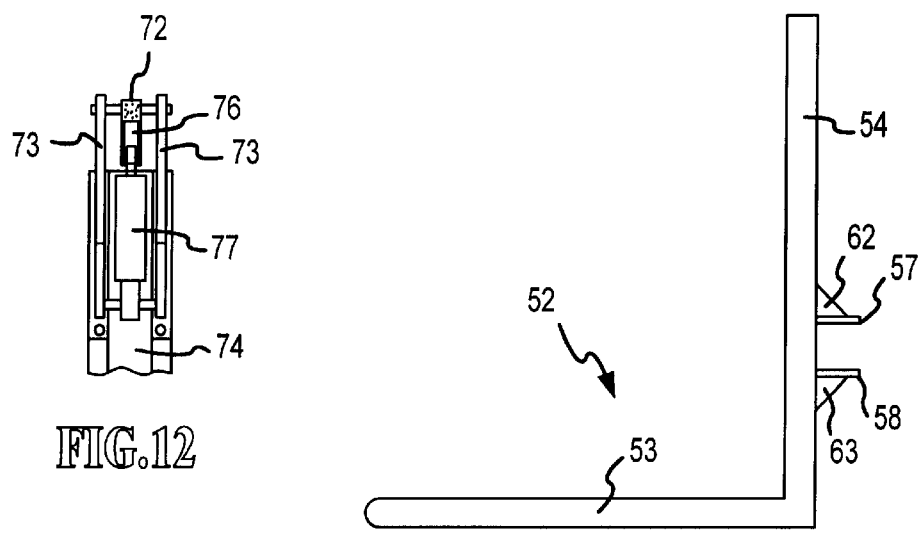
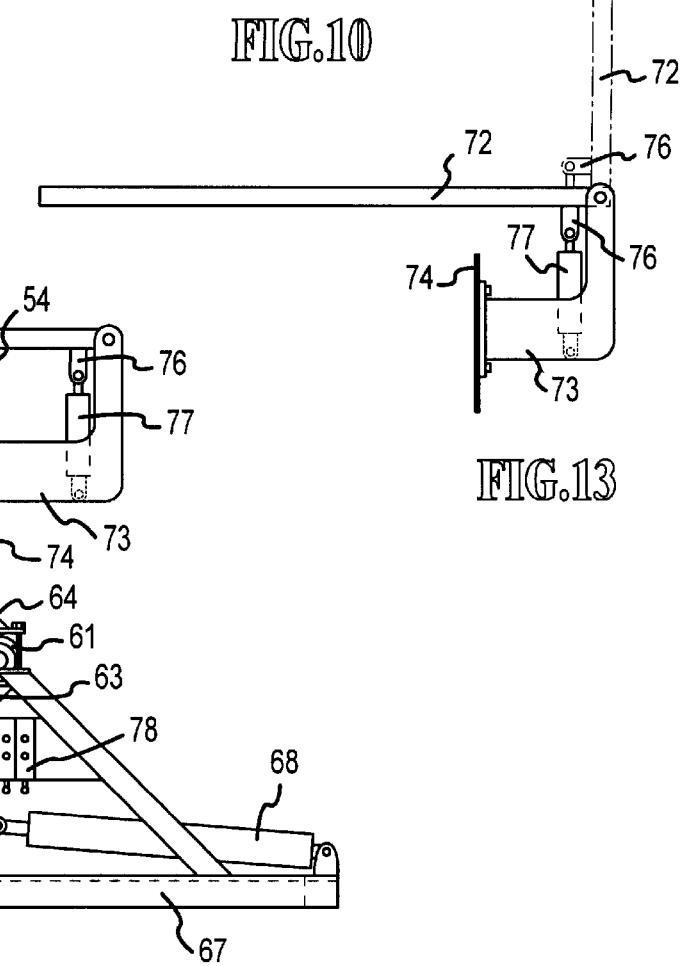
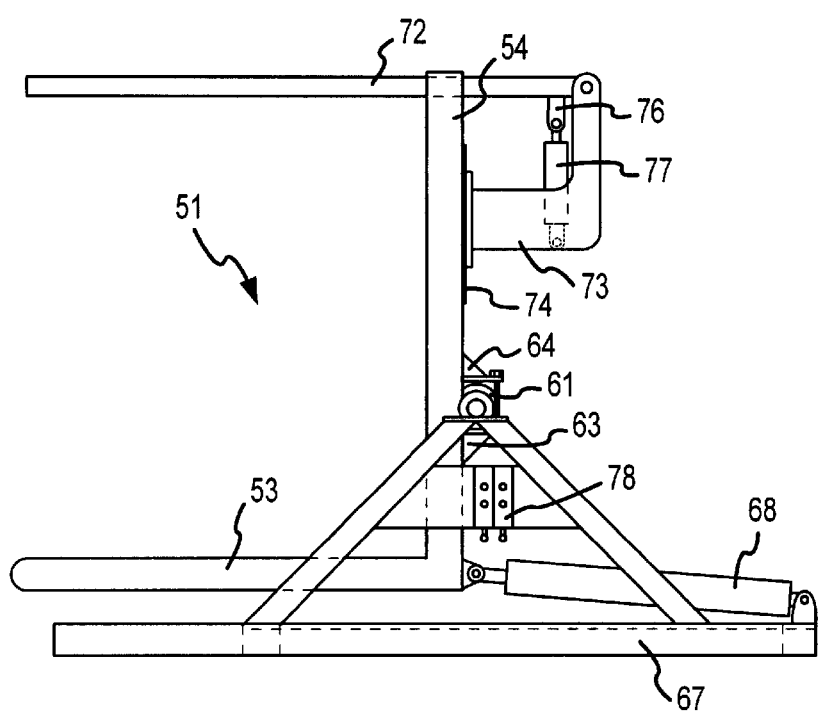

METHOD AND APPARATUS FOR HANDLING, TRANSPORTING, PALLET REMOVAL AND LOADING CARTONS OF FROZEN ANIMAL PRODUCTS ONTO VESSELS

CROSS-REFERENCE TO RELATED APPLICATIONS

This is a Continuation Application of a CPA of pending U.S. patent application Ser. No. 09/303,792, filed Apr. 30, 1999 (abandoned Sep. 8, 2000, which is a CIP of U.S. patent application Ser. No. 09/093,461, filed Jun. 8, 1998 (U.S. Pat. No. 5,980,198).

BACKGROUND INFORMATION

1. Field of the Invention

The present invention relates to the field of cargo handling, and in particular, to the rapid transportation and loading of cartons of frozen animal products onto a refrigerated vessel.

2. Background of the Invention

While there have been significant advances in the methods employed for the loading and unloading of vessels, the loading of refrigerated, cartonized cargo, and in particular, frozen animal products has proved particularly difficult due to several intractable problems. As a result, the transfer of the products from the packers to their loading aboard a vessel is presently carried out by processes that involve high costs and significant expenditure of manual labor, and which include bottlenecks that slow the process, that may result in product degradation or spoilage, and that result in long loading times for the product onto the vessel. It is presently common for the handling of cartons of frozen animal products to proceed as follows.

A large volume of animal products such as frozen chicken, turkey, beef, pork and seafood products (including livers, hearts, parts, deboned meat and the like) are frozen and shipped in and from the U.S. in relatively flat boxes. For example, chicken thighs, legs or quarters may be shipped in cartons of about 23.5 inches in length by 16.5 inches in width by 4 to 6.25 inches in height (59.7 cm by 41.9 cm by 10.2 to 15.9 cm). A preferred standardized box size for use with this invention, however, would be 24 inches by 16 inches (61.0 cm by 40.6 cm) with the height of the box varied to hold the particular products to be shipped. A box of such chicken parts may weigh on the order of 35 to 45 pounds (16 to 20 kg).

For simplicity, reference will hereafter be made to cartons of chicken parts, as other animal products may be handled in a similar manner.

Owing to the size restrictions imposed by standard trucks and trailers, the cartons are normally stacked on 40×48 inch (102×122 cm) pallets in layers of five cartons arranged with two cartons placed on the pallet in an end-to-end relationship beside three cartons placed side to side with their long axes perpendicular to those of the first two cartons. A palletload of cartons generally contains between about 10 to 12 such layers of cartons.

The packer sends the fresh chicken parts in such palletloads to a blast freezer/cold storage warehouse. At the warehouse, the cartons are restacked with spacers between the layers thereof. The spacers allow the circulation of air between the layers of cartons. Once the cartons are so stacked, the palletload of cartons are transferred to a blast freezer, which forces air chilled to about −40° F. (−40° C.) between and around the cartons. When the freezing process is completed, the cartons are removed from the blast freezer and placed in a rotator. The load of cartons is then rotated 90 degrees onto its side, the spacers are removed, and the load of cartons is then rotated back to an upright position in which it rests once more on the pallet. In order to facilitate transportation and storage of the stacks of cartons, the stack may be wrapped with a stretchable plastic film to help prevent excessive sliding of the layers of cartons relative to one another. Lift trucks are then used to move the cartons of frozen chicken products and transport them into the cold storage warehouse.

When the time comes to load a ship, lift trucks are used to remove the palletloads of cartons of chicken parts from the warehouse, and tie cartons are placed inside dry van trucks or truck trailers for transportation to the dock. These are typically uninsulated and unrefrigerated, and thus can be deleterious to the frozen product contained therein. At the dock, the cartons are removed from the truck trailer and placed on the dock, where they are subsequently lifted into the hold using the ship's gear, such as by using slings, lifting platforms or flying forks to lift the cartons and pallets.

In the hold, lift trucks engage the pallets and transport the pallets with their stacks of cartons to locations near where the cartons will be stowed. Stevedores then manually remove the cartons from the pallets and stack them without pallets for shipping. The pallets are then returned to the square of the hatch and are stacked to be hoisted out of the hold and back onto the dock by the ship's gear. The square of the hatch is the volume of space extending vertically downward from the open hatch to the floor of the cargo hold.

This process is quite inefficient. Delays in bringing a sufficient quantity of product to the dock and in unloading the cartons from the truck can increase the time needed to load the vessel. The space constrictions in the vessel limit the number of workers who can be engaged in stowing of the cartons, and thus may create a backup for product arriving at the dock. Excessive delays in loading which result in the cartons being left on the dock or in the truck can allow the product to begin to thaw, which can result in spoilage or otherwise render the product unmarketable. Delay in loading may also result in increased condensation of moisture on the cartons which can complicate the handling process. As the industry is seeking to use less wax on the cartons and to utilize paper-coated boxes, the damaging effect of condensation and internal thawing on the boxes is increased.

The breakage rate for pallets during this process is fairly high. As many as half of the pallets may suffer some breakage, and this can result in splintered wood, which may contain protruding nails, being left at the warehouse, on the dock or in the cargo hold of the vessel. Additional work is thus required to collect the pallets and pallet debris, to extract it from the hold of the ship or remove it from the dock, and to repair or discard the broken pallets. Further, the existence of pallet debris at the warehouse, on the dock, and in particular in the hold of the vessel, presents a risk of injury to workers.

Inefficient as this method of handling may be, there are a number of constraints that have made it difficult to improve. The main problems encountered is that the holds of the ship are irregular both in the overhead clearance and in the shape of the floor space. Not only does the overhead clearance of the cargo holds vary from ship to ship, and perhaps within a ship from hold to hold, the internal structure of the vessel and of the cooling system within it can result in overhead clearances that vary depending on the location within the hold.

Another difficulty in loading such cargoes is that the cartons are typically stacked to a uniform height after freezing. This is necessary for efficient use of the cold storage warehouse. This uniform height is generally ten or twelve layers of boxes arranged on a lift truck pallet, but it may vary somewhat from this number depending on the size of the cartons. The cartons are unitized by wrapping them with a stretchable plastic film that aids in transportation of the palletloads by fork lift, etc. However, space on refrigerated vessels is at such a premium that the wasted space of such pallets is considered undesirable. Thus, it has been considered necessary to avoid stowing the cartons on the pallets, and thus it has been the practice to stow the cartons in the ship by restacking them without the pallets within the ship. Moreover, since the ceiling height of holds on ships varies, and is seldom equal to the height of the cartons when stacked for warehousing purposes, it has heretofore been considered essential to manually stack the cartons in order to obtain as complete a filling of the vessel as possible.

SUMMARY OF THE INVENTION

The present invention provides a method for transportation of cartons of frozen products from the blast freezer/cold storage warehouse into a refrigerated vessel. The method may be practiced as follows.

As mentioned above, in preparing cartons of animal products and the like for freezing, the cartons are restacked on a pallet with spacers between the layers of cartons. The spacers permit the flow of cold air between the layers of the pallets and thus facilitate the rapid freezing of the product. At this stage, as the cartons require restacking with the spacers, a sling pallet may be used under the stack to be frozen.

A sling pallet, namely, a pallet with two or more channels in its upper surface, each of which extends from a first side of the pallet to the opposite side may be used in the present method. Preferably, the channels are parallel to one another and are symmetrically disposed with respect to the upper surface of the pallet. Changing to sling pallets at this stage permits the ordinary pallets to be stacked and returned to the producer.

Although it is the general practice to use pallets having dimensions of 40×48 inches (102×122 cm) in the frozen chicken parts industry to allow loading thereof into enclosed vans or trailers, the method of the present invention permits the use of 48×48 inch pallets (122×122 cm), which hold six rather than five cartons per layer. If such a layout is to be used, of course, and if restacking of the cartons is performed to accomplish this transformation, the cartons could be restacked on a sling pallet at that time. On the smaller pallet, the first layer of boxes is arranged with two cartons adjacent one side of the pallet in end to end alignment. Three cartons in a side-by-side arrangement are placed adjacent the other edge of the pallet (the two by three stacking pattern). The cartons should be stacked on the pallet such that the channels in the pallet extend longitudinally under the two end-to-end cartons and transversely under the three side-by-side cartons. For the larger pallets, where the cartons are arranged in two rows of three side-by-side cartons, one channel should run under each such row transversely to the long axes of the cartons. The next higher layer would have the same pattern, but would be rotated ninety degrees, and the layer on top of that would be identical in layout and orientation to the first layer (the three by three stacking pattern). This is the preferred configuration.

After the cartons are stacked with spacers between layers, the contents of the cartons are frozen in the blast freezer. The pallet and stacks of cartons are then placed in a rotator to facilitate removal of the spacers. It is also possible to replace a standard pallet with a sling pallet at this stage, rather than stacking the cartons with the spacers on the sling pallet as discussed above, although the configuration of the boxes cannot be changed from five boxes per layer to six boxes per layer at this stage without restacking.

After removal of the spacers and re-rotation of the palletload of cartons, the cartons may be wrapped with stretchable plastic film and slings may be inserted about the stack of cartons. The cartons may then be transported for storage in the refrigerated warehouse by means of lift trucks or other transportation means.

When the time for loading of a vessel comes, the palletloads of cartons are removed from the cold storage warehouse and loaded onto a truck for transportation to the dock. Preferably, the slings are placed on the stacks of cartons before they are loaded onto the truck, although the slings could be installed at the dock. Rather than loading them into uninsulated, enclosed trucks or trailers for transportation to the docks, as in the prior art method, the palletloads of cartons are loaded onto flatbed trucks or the flatbed trailer of a tractor-trailer truck and an insulating blanket of any known type which is adequate to protect the cartons against excessive warming is placed over them to reduce warming and possible melting that could occur in the uninsulated trucks. Hold-down straps may then be fastened over the stacks of cartons and blanket and tightened using the known belt and winch systems. Alternatively, if the blanket is of a sufficiently strong material or construction, the blanket itself could be used as a hold-down for the stacks of cartons and the blanket could be fastened down tightly atop the cartons. This might be accomplished, for example, by affixing straps of webbing in positions corresponding to winches on the trailers which extend beyond the edge of the blanket and pulling these tight with winches.

The trucks are then driven to the dock and positioned alongside the ship, where the ship's gear is used to lift the preslung stacks of cartons by their slings off of the truck and load them directly into the cargo hold. Since the cartons are lifted by the slings, the pallets remain on the truck and can then be transported directly back to the blast freezer/cold storage warehouse for further use. This direct loading of the ship from the flatbed truck eliminates the need for loading the cartons off the truck and onto the dock. This is important, as it reduces the amount of time the cartons are exposed directly to the ambient air and humidity, reducing the likelihood of thawing and of accumulation of condensation. Furthermore, the elimination of the need to unload trucks out onto a dock and thereafter load them into the ship eliminates delays in feeding the cargo into the ship. This is also important to the practice of the present invention since the improved efficiency in stowage provided by the present invention can only be fully utilized if the cargo can be loaded on board with sufficient speed to keep pace with the increased speed of the stowing operation.

The ship's gear deposits the cartons in the hold onto a special landing pad. This is a sling/lift truck pallet that can receive the cartons but which has channels to receive the slings so that the slings may be removed from the stacks of cartons. The landing pad also permits the stacks of cartons to be picked up directly by a load push lift truck owing to the existence of open-top channels into which the blades (or platens) of the lift truck may be inserted.

A load push lift truck, has at least two and preferably three blades extending from its lift mechanism. Preferably, the three blades are relatively broad, and have smooth, polished upper surfaces to facilitate the sliding of the cartons thereon. A push plate associated with the lift mechanism which can be extended by means of hydraulic cylinders from a retracted position adjacent the lift mechanism to a position adjacent the ends of the blades is used to extract the blades from under the cargo. Preferably, such a lift truck includes a side-shift mechanism which permits small lateral adjustments in the position of the cargo to facilitate its precise placement. Such load-push lift trucks are known in the art of specialized lift trucks.

When a cargo is landed on the landing pad, the slings may be removed from the stack of cartons. The load push lift truck positions the push mechanism in its fully retracted position and slides its blades between the blocks of the landing pad. Thereafter, the entire stack of cartons is transported to its stowage location. If the stack is to be positioned on the floor of the cargo hold, the operator maneuvers the load into position, possibly using the side shift mechanism to position it against an adjacent stack or wall, and activates the load push mechanism while backing the lift truck away from the location or allowing the load push mechanism to push it away from the stack of cartons. Additional layers of cartons can then be manually stacked on top of the cartons to fill the hold from floor to ceiling from stacks of cartons transported to a nearby location by the load push lift truck.

Attentively, in order to reduce the amount of lifting required by the stevedores, the lift truck may first position stacks of cartons in areas to be filled. The stevedores then commence manual stacking of layers of cartons on the floor of the vessel by removing some of the layers of cartons from the stacks deposited by the load push lift truck. Once the desired number of layers have been laid down such that a full stack of cartons will fill the remainder of available space to the ceiling, the load push lift truck can then deposit full height stacks of cartons on top of such partial stacks to complete the stowing process at that location.

When the loading of the hold is completed except for the area under the square of the hatch, the load push lift truck, removed slings, if any, and landing pad may be removed from the hold. Thereafter, the square of the hatch may be filled by landing stacks of cartons therein using the ship's gear. In the absence of a landing pad, the slings may not be easily removable from the stacks of cartons so landed. As such, in order to speed the loading of the square of the hatch, the slings may be left in place. Some manual restacking of cartons to fill the square of the hatch may of course be necessary in order to avoid the wasting of space in the cargo hold.

A number of operators of cold storage facilities have the practice of moving all of their frozen chicken to the dock in refrigerated trucks. As most of such trucks will not accept a 48×48 inch (122×122 cm) pallet, 40×48 inch (102×122 cm) pallets are commonly used. The use of such refrigerated trucks for transporting the frozen chicken may be used for a variety of reasons. For example, the cold storage warehouse may be located too far from the dock to allow for unrefrigerated transportation.

Regardless of the reason, however, the result is that a large amount of the frozen chicken produced is shipped on 40×48 inch (102×122 cm) pallets. As a result, the two by three stacking method is used. These pallets are typically loaded such that the long axis thereof is parallel to the long axis of the truck. The top and bottom boards that make up the upper and lower surfaces of the traditional pallet generally are of 40" length and run transversely to the long axis of the pallet. It is not possible to convert such a pallet to a sling pallet by removal or repositioning of the top boards. As the channels for a sling pallet must run parallel to the long axis of the 40×48 inch (102×122 cm) pallet in order to be positioned parallel to the long axis of the two end-to-end boxes in the two by three pattern, and as the boards of the more typical 40×48 inch (102×122 cm) pallet run transverse to the long axis, removal of planks would not result in channels through which slings could be extended. Planks could be removed from the bottom of the pallet and, with some clearancing, channels could be made to allow insertion of the forks of a lift truck to permit the pallet to be picked up by a lift truck from any side.

This problem may be overcome in the present invention by the use of one or more dockside rotators that are capable of rotating, or tipping, one or more palletloads of frozen chicken onto its side. Preferably the palletload(s) of frozen chicken are rotated by 90° or more, and preferably by about 100°. This permits the pallet to be removed easily. The rotator may have channels in appropriate locations to permit slings to be positioned such that, when the stack of cartons of frozen chicken is rotated back to an upright position, the slings may be connected to a hook or spreader bar lowered by the ship's gear and the stack of frozen chicken may be lifted, without a pallet, into the hold of the ship.

Of course, where the stacks of frozen chicken will be rotated through more than 90°, and even if the stacks of frozen chicken are only rotated 90°, it is preferred to provide means for preventing the stack from sliding too far away from the pallet upon rotation, and to prevent cartons of frozen chicken from falling from the top of the stack. This can be accomplished by providing the rotator with adjustable retaining bars that can be opened and closed, as desired.

The rotator mentioned above may be configured to rotate one, two or more stacks of frozen chicken at a time. Preferably, the rotator is operated hydraulically, in which case electric or diesel-powered hydraulic pumps may be used to provide the pressurized hydraulic fluid. The retaining bars may also be opened and closed hydraulically.

Calculations based on the speed with which a truck can be unloaded using fork lifts and the cycle time typical of ships' gear, there is adequate time to perform the rotating of the palletloads of frozen chicken, the removal of the pallets, the placement of the slings and the re-rotation of the stack of cartons of frozen chicken to an upright position.

BRIEF DESCRIPTION OF THE DRAWINGS

FIG. 1 is a perspective view of a wooden sling pallet according to the present invention.

FIG. 2 is a perspective view of a wooden landing pad according to the present invention.

FIG. 4 is a top view showing the two by three stacking pattern on a 40×48 inch (102×122 cm) wooden pallet.

FIG. 5 is an end view of a 40×48 inch (102×122 cm) wooden pallet.

FIG. 6 is a side view of a wooden pallet with planks removed from the bottom surface, and with clearancing of the longitudinal beams.

FIG. 7 is a front view of a pallet rotator.

FIG. 9 is a side view of a pallet rotator.

FIG. 10 is a side view of a support member of a pallet rotator.

FIG. 12 is a side view of the retaining bar mechanism.

FIG. 13 is a rear view of the retaining bar mechanism with parts broken away.

DETAILED DESCRIPTION OF THE PREFERRED EMBODIMENTS

Figure 3:
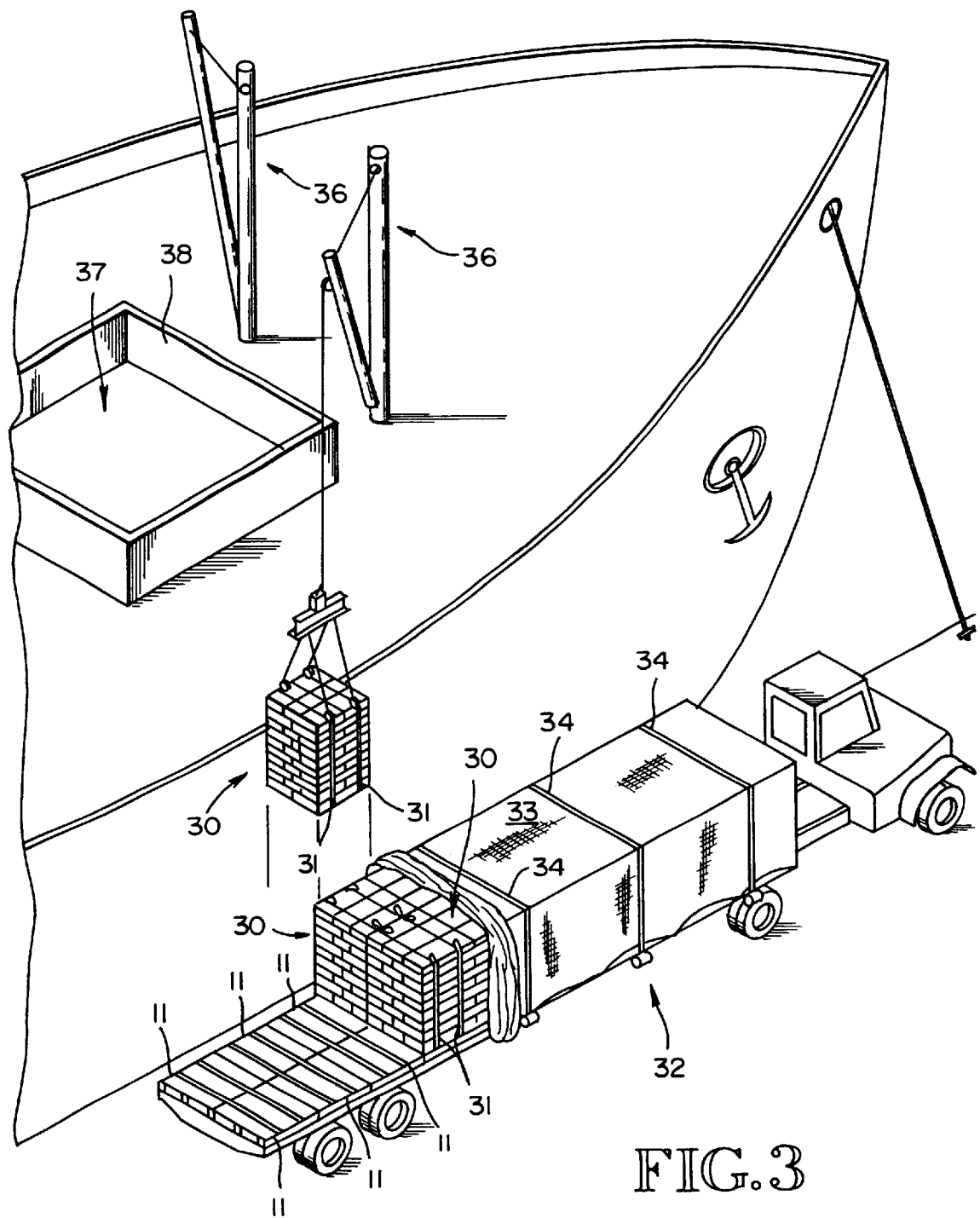
FIG. 3 is a perspective view of a flatbed tractor-trailer carrying a plurality of stacks of cartons being unloaded into a vessel.

FIG. 1 depicts a wooden sling pallet 11 made in a manner similar to ordinary wooden lift truck pallets. The sling pallet 11 is made by arranging three pieces of nominal 4 by 4 inch (nominal 10.2 by 10.2 cm) lumber 12 arranged in parallel with two such pieces of lumber 12 positioned adjacent the periphery of the pallet 11 and one piece 12 extending along its center line. The upper and lower surfaces 13, 14 of the pallet are formed of comparatively flat boards 16 extending transversely to the three pieces of lumber 12. These boards 16 may be, for example, a nominal one inch (2.54 cm) in thickness, and may be affixed by nails, screws, or other means to the upper and lower sides of the three pieces of lumber 12. Open-top channels 17 are formed in at least the upper surface of the pallet by adjusting the spacing between the boards 16. The channels 17 should be of a width greater than that of the slings to be used, and the depth of the channels 17 should likewise be greater than the thickness of the slings such that the slings (including the eye portion) may be inserted therethrough when a stack of cartons is loaded onto the pallet 11. Of course, sling pallets may be made of any of a variety of materials, such as plastics, metals and fiberglass, and the manufacture of pallets using such materials is known in the art of pallet manufacturing. Likewise, molding, stamping, welding, bonding, forming or other known methods may be used to make the sling pallet. The material and method used to make the pallet, however, is of less importance than the provision of channels therein which can receive slings.

In use, slings 31 may be prepositioned in the channels 17 prior to loading a stack of cartons thereon, or may be drawn through the channels after loading of the pallet by means of a rod with a hooked end or the like. Of course, it is also possible to use a standard pallet, to preposition slings on the pallet, and thereafter load the pallet with the cartons. However, the channels provide a convenient means for positioning the slings and provide the ability to add the slings either before or after loading of the pallet.

FIG. 2 depicts a wooden landing pad 21 according to the present invention. The landing pad 21 is formed from a bottom sheet 22 of plywood. Blocks of nominal 4 by 4 inch (nominal 10.2 by 10.2 cm) lumber 23 are affixed to the bottom sheet 22 by means of nails, screws, adhesive or other means in a pattern which provides two channels 24 which extend from one edge of the bottom sheet 22 to an opposite edge thereof between the blocks 23. As with the channels 17 of the sling pallet 11, these channels 24 should be of sufficient width and depth to allow a sling 31 to be drawn therethrough.

As the preferred load push lift truck of the present invention has three blades, a second set of channels 26 is provided to receive the blades of the lift truck. These channels 26 extend transversely between the blocks 23, and are of a depth sufficient to receive the blades of the load push lift truck. As with the sling pallet 11, the landing pad 21 may be made of materials other than wood, and by methods other than the use of nails, screws and the like. The important consideration in making a suitable landing pad is the provision of the channels as discussed above.

Load push, side shift lift trucks are known in the art of specialty lift trucks. Such lift trucks are discussed, for example, in U.S. Pat. 4,752,179 to Seaberg discusses such a lift truck. A preferred lift truck according to the present invention would include either two or three relatively flat blades (platens) which may conveniently have a width of 4 to 8 inches (10.2 to 20.3 cm), and would include side shift capability. The blades would be smooth and preferably polished, and would have rounded edges. The load push system should be sufficiently powerful to push a full stack of cartons of frozen chicken parts or the like off of the blades and onto another stack of cartons.

One preferred embodiment of the present method involves the transportation and stowage of the cartons of frozen products in the following manner. The preferred embodiment will be described with reference to cartons of frozen chicken parts. However, it is applicable to other frozen animal products stored in similar cartons.

A standard lift truck is used to remove stacks of cartons 30 of frozen chicken parts stacked on sling pallets 11 from the cold storage warehouse. If slings 31 have not already been provided, hooked rods are used to draw the slings 31 through the channels 17 in the pallets 11. The palletloads of cartons are then placed on a flatbed truck trailer 32. Once the trailer 32 is fully loaded, an insulating blanket 33 is used to cover the cartons 30 and is held in place by straps 34 which overlie the blanket 33 and are fastened to the frame of the trailer 32. Any of a variety of insulating blankets may be used. An R-2 insulating quilted blanket made of two sheets of a quilted water-resistant nylon with 10 ounce polyester insulation therebetween should be sufficient for most applications. Preferably, the nylon outer layers are of a light color to reflect sunlight. Blankets of this type are offered by RefrigiWear, Inc. of Dahlonega, Ga. under the WEATHERGUARD mark, for example. Once the blanket 33 and cartons 30 have been secured in place, the tractor-trailer 32 is then driven to the dock.

At the dock, once the vessel is ready to receive the stacks of cartons 30 from the trailer 32, the straps 34 and insulating blanket 33 are removed, and the ship's gear 36 (or a shore crane) is used to lift the stacks off the sling pallets and into the hold. Preferably, the blanket 33 is rolled up as the stacks of cartons 30 are lifted from the trailer by the ship's gear 36. The insulating blanket 33 is then returned to the warehouse for use on the next load.

The ship's gear 36 deposits the stack of cartons in the ship's hold 37 on a landing pad 21 situated in the square of the hold. The square of the hold is the volume space extending vertically downward from the open hatch 38. Once the stack of cartons 30 has been deposited on the landing pad, the slings 31 are released from the ship's gear 36 and are drawn through the channels 24 in the landing pad 21 to remove them from the stack of cartons.

A load push lift truck is then used to lift the stack of cartons off the landing pad 21 and to transport the cartons to the storage location. At this stage, either of two approaches may be taken. The load push lift truck may initially deposit the cartons 30 in their final stowage locations, with a view to stevedores subsequently filling the remaining space atop the stack from a lift-truck-deposited stack nearby, or the lift truck may deposit the stack in a convenient location with a view to the stevedores breaking down the stack into two or more shorter stacks on top of which the load push lift truck may deposit a full stack of cartons 30, the combined height of the hand-stacked and lift-truck-deposited cartons filling the available vertical space.

In order to deposit a stack of cartons 30 on the floor of the cargo hold, the lift truck operator moves the stack into the desired position and lowers the blades of the lift truck to the floor. If necessary, the side shift can be used to position the stack in abutting relation with an adjacent stack or wall. The lift truck operator then simultaneously actuates the load push mechanism and either backs the lift truck away from the location or allows the load push mechanism to push the lift truck back from the stack (assuming the front of the stack is engaged with another stack or with a wall). The process for depositing a stack of cartons 30 on top of another partial or full stack is the same, except the lift truck positions the blades immediately above the full or partial stack on top of which the full stack is to be deposited.

For stowage in irregular spaces, such as adjacent a sloping wall, in spaces too small for a full stack to be inserted or the like, the lift truck may deposit a full stack of cartons near such stowage location and the stevedores can stow the cartons in such areas by hand.

When substantially all of the cargo hold has been filled, apart from the square of the hatch 38, the lift truck and landing pad 21 are removed from the hold, and the square of the hatch is filled by depositing stacks of cartons directly into the square of the hatch using the ship's gear. Some manual stowage of cartons will likely be necessary, of course, as the ceiling height under the closed hatch may not be fillable merely by loading full stacks of cartons one on top of another.

Of course, in the absence of the landing pad 21, most of the slings used to load the stacks of cartons into the square of the hatch may have to be left in the cargo hold. However, this will facilitate the offloading of the vessel, and the cost of the cargo slings is offset by the lower labor and other costs achieved by the practice.

It is important that the elements of the aforementioned method be used together for maximum efficiency. At present, using the prior art method of transportation and stowage, there are several critical bottlenecks that prevent the efficient handling of the cargo. The current manual method of stowage is capable of stowing not more than about 20 to 40 metric tons per hour per hatch. At this pace, the unloading process for the trucks, the extracting pallets from the cargo hold and handling thereof and other ship-side activities become extremely hectic. As the present method would permit an increase in the stowage rate to about 70 to 110 metric tons per hour per hatch, the prior art method of using enclosed trucks, unloading the trucks onto the dock, transporting the cartons into the hold together with pallets and the like would not be able to keep pace with the stevedores in the hold, even though the number of stevedores required for the practice of the present method is substantially less than required for the prior art method.

Similarly, the use of the present method speeds loading of the cartons onto the trucks and placing thereof under the ship's gear, so that the transportation of the stacks of cartons from the warehouse to the dock can keep pace with the loading.

Not all wooden pallets can conveniently be made into sling pallets by removal and or rearrangement of boards 16 which form the upper surface of the pallet. Referring to FIGS. 4–6, many 40×48 inch (102×122 cm) pallets 11 are made with 40 inch (102 cm) boards 16 forming their upper and lower surfaces. Removal of boards 16 from the upper surface of such a pallet 11 would result in channels which extend transverse to the long (48 inch, 122 cm) axis of the pallet. In order to lift a stack of cartons of frozen chicken which are stacked in the two by three pattern, shown in FIG. 4, with two slings, one sling must run longitudinally under the two end-to-end cartons 41, 42 lengthwise to them, and the other sling must run transversely under the three side-by-side cartons 43, 44, 46.

Various equipment limitations result in the use of pallets as described above. One such limitation is the existence of a large fleet of refrigerated trucks which require the loading of 40×48 inch (102×122 cm) pallets with their long axes parallel to the longitudinal axis of the truck. Such trucks may be used for a variety of reasons to deliver palletloads of stacks of frozen chicken directly to the dock. So-called four-way pallets can be made by removal and/or rearrangement of boards 16 from the lower surface of a pallet 11, and by cutting through portions of the nominal 4×4 inch lumber 12 to form channels 47, 48 which allow for insertion of the blades of a lift truck transversely to the long axis of the nominal 4×4 inch lumber 12, as shown in FIG.6. However, unless 48 inch (122 cm) boards 16 are used for the upper and lower surfaces of the pallet 11, and unless 40 inch (102 cm) nominal 4×4 inch lumber is used therebetween, removal of boards 16 from the upper surface of the pallet 11 will not produce channels 17 which run parallel to the long axis of the pallet. In any event, the fact remains that such pallets 11 are not always readily available and thus cannot always be substituted for the 40×48 inch (102×122 cm) pallets 11 in which the boards 16 extend transversely to the long axis of the pallet.

Where such 40×48 inch (102×122 cm) non-sling pallets 11 are used, the ship loading method of the present invention may still be used according to another preferred embodiment of the invention by use of a rotator 51 as shown in FIGS. 7–13. The rotator 51 of the present invention includes a plurality of L-shaped brackets 52 which are preferably made of steel tubing having a rectangular cross section. Such brackets are comprised of bottom beams 53 and back beams 54 The brackets 52 are adapted for attachment to a square cross section beam 56, as shown in FIG. 10, by parallel plates 57, 58 which are welded to the back beam 54 and extend perpendicularly therefrom. The L-shaped brackets may be mounted to the square beam 56 by bolts 61 which pass through holes adjacent the distal edges of the plates 57, 58.

Figure 8:
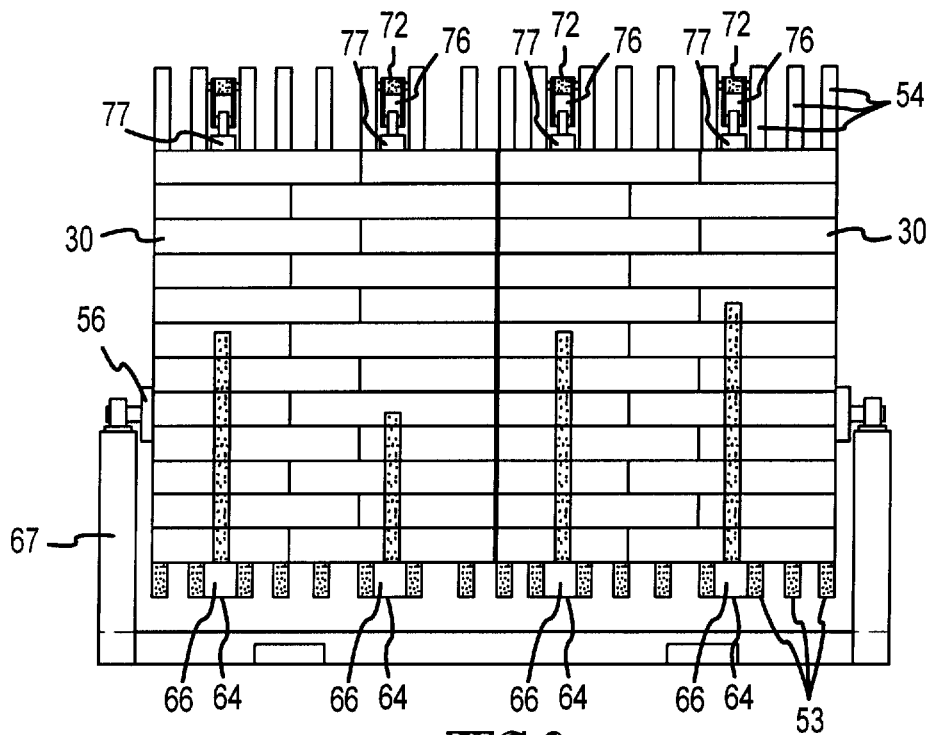
FIG. 8 is a front view of a two-pallet pallet rotator with two palletloads of cartons of frozen chicken aboard and with slings in place, with parts of the slings broken away.

The plates are positioned apart from one another by a distance which is just sufficiently larger than the width of the square beam 56 to permit them to fit on either side of it. Thus, when the plates 57, 58 of an L-shaped bracket 52 are positioned on the square beam 56, and when bolts 61are extended through the plates and nuts are tightened onto their ends, the plates 57, 58 are drawn together, gripping the beam. The location of the L-shaped bracket along the square beam 56 may thus be adjusted by loosening the bolts 61 and sliding the L-shaped brackets 53 laterally along the square beam 56. Gussets 62, 63 may be welded to the plates 57, 58 and to the back beam 54 of the L-shaped bracket to provide greater resistance to flexure to the plates 56, 57. As shown in FIGS. 7 and 8, bottom plates 64 may be welded between the bottom beams 53 of pairs of L-shaped brackets 52 to form sling channels 66 therebetween. Preferably, two sling channels 66 are provided for each stack of cartons of frozen chicken 30 which is positioned on the rotator 51. The rotator 51 shown in FIGS. 7 and 8 is adapted to receive two such stacks of cartons of frozen chicken 30.

The beam 53 is pivotably mounted to a frame 67 such that it is free to rotate about its longitudinal axis. A plurality of L-shaped brackets 52 are spaced along the length of the beam 53, including both pairs of L-shaped brackets 52 having bottom plates 64 and single L-shaped brackets 52. As shown in FIG. 9, hydraulic cylinders 68 are attached between the left and rightmost L-shaped brackets 52 such that the L-shaped brackets 52 and beam can be rotated from a first position 69 in which the back beams are vertical to a second position 71 in which they have been tipped past the horizontal.

If the stacks of cartons of frozen chicken 30 were to be rotated past 90° without some form of restraint, it is possible that cartons of frozen chicken could fall from the stack 30, or that the entire stack 30 could slide out of the rotator 51. In order to prevent this, as best shown in FIG. 9 and 1, a plurality of restraining bars 72 are pivotably mounted to the pairs of back beams 54 which are connected by bottom plates 64 by means of pairs of mounting brackets 73. The mounting brackets 73, in turn, are mounted on a plate 74 which extends between the two back beams 54 and which is bolted to the back beams 54 of the L-shaped members by means of bolts extending through the plate 74 and back beams 54. A plurality of mounting holes is provided on the back beams 54 to which the plate 74 is to be mounted. This permits the height of the restraining bars 72 above the bottom beams 53 to be adjusted according to the height of the stacks of cartons of frozen chicken.

An arm 76 depends from each of the restraining bars, and a hydraulic cylinder 77 is mounted between the distal end of the arm 76 and the pairs of mounting brackets 73, such that the hydraulic cylinder 77 can pivot the restraining bars 72 between a closed position in which they are parallel to the bottom beams 57 of the L-shaped brackets 52 to an open position in which they are parallel to the back beams 54.

The hydraulic cylinders 68, 77 are manually controlled by conventional manual hydraulic controls 78 mounted to the frame, one set of controls being for the cylinders 68 that power rotation of the rotator 51 and the other set for controlling the hydraulic cylinders that open and close the restraining bars. The controls could be interlocked in a conventional manner such that the rotator 51 would not operate unless the restraining bars 72 are in their closed position.

The rotator 51 may be conveniently powered by a diesel or electric hydraulic power pack (not shown) of conventional design, or by other sources of hydraulic power. Of course, other methods could be used to power the rotator 51, such as electric ball screws, pneumatic cylinders, and the like, but hydraulic operation is considered the most convenient.

In use, where stacks of cartons of frozen chicken 30 are presented along side a ship for loading without being on sling pallets or being preslung, a rotator may be used. To do so, the controls 78 are used to move the restraining bars 72 to their open position. Fork lifts would be used to move the palletloads of stacks of cartons of frozen chicken 30 into position on the rotator 51. The restraining bars are then closed and held in place by means of the hydraulic cylinders 77, and the hydraulic cylinder 68 is cycled to rotate the stack of cartons of frozen chicken 30 from a vertical orientation through 90° or more. Preferably, the rotator 51 rotates through about 100°. While it should be possible to remove the pallet manually with rotation of only 90 °, 100° should facilitate this process without causing excessive sliding of the stack of cartons of frozen chicken 30 away from the pallet 11.

At this stage, with the stack of cartons of frozen chicken rotated from vertical to about horizontal, the pallet 11 may be removed, and slings may be positioned in the channels 66. This accomplished, the rotator 51 can be returned to its upright position. As it rotates back, the stack of cartons will slide down against the bottom beams 53 of the L-shaped brackets. The restraining bars 72 may then be moved to their opened position by the associated hydraulic cylinders 77 and the slings may be affixed to a hook, spreader bar or other device by means of which the ship's gear can hoist the stack of cartons of frozen chicken, one or more at a time, out of the rotator 51 and into the hold of the ship, to be landed on a landing pad 21. The remainder of the stowing process is as described above.

In addition to allowing the palletless loading of stacks of cartons of frozen chicken 30 as described above, the rotator may be used for removing pallets and slinging such stacks for a variety of other purposes, such as preparing such stacks of cartons of frozen chicken 30 for loading aboard a flatbed truck for transportation to the dock.

While the present invention has been described with reference to the preferred embodiments, it will be apparent to those skilled in the art that modifications to the method may be-made within the scope of the invention.

What is claimed is:

1. A method of transporting and stowing cartons of frozen animal products in a vessel, said vessel having a hold therein, wherein said cartons are initially arranged in stacks on pallets, the method comprising:

placing said stacks of cartons on said pallets in a rotator;

securing said stacks of cartons against excessive movement away from said pallets;

rotating said stacks of cartons through at least 90°;

removing said pallet from said rotator;

providing at least two cargo slings extending around said stack of cartons;

providing a landing pad within the hold of said vessel, said landing pad having at least two transversely extending channels in the upper surface thereof adapted to receive the cargo slings, and having dimensions sufficient to allow cargo slings to be drawn therethrough, said landing pad further including a plurality of channels formed in its upper surface of size and arrangement sufficient to receive the blades of a load push lift truck;

lifting said cartons off the landing pad using a load push lift truck having a load push mechanism associated with a plurality of cargo supporting and lifting blades by inserting the blades of said lift truck into said plurality of channels and raising said blades;

transporting said cartons to a stowage location; and depositing said cartons at the stowage location by said load push mechanism.

2. The method of claim 1 wherein said rotator is positioned alongside said vessel, and wherein said stack of cartons is lifted from the rotator into the hold of said vessel.

3. A method of transporting to and stowing stacks of cartons of refrigerated products into a vessel said vessel having a hold therein, wherein said cartons are initially arranged in stacks on pallets, the method comprising:

positioning said stack of cartons and pallet in a rotator located adjacent a vessel to be loaded;

restraining said stack of cartons against excessive movement away from said pallet;

rotating the stack of cartons from a generally vertical orientation to a generally horizontal orientation, said change in orientation being of not less than 90°;

providing at least two slings arranged about said stack of cartons;

lifting said stack by said slings into the cargo hold of said vessel and depositing said stack of cartons into said cargo hold;

lifting said stack by a lift truck without use of a pallet; and depositing said stack of cartons in a final stowage location by said lift truck.

4. The method of claim 3 further comprising providing a landing pad in the cargo hold of said vessel, the upper surface of said landing pad being adapted to receive said at least two slings and wherein said stack of cartons is deposited in said cargo hold onto said landing pad.

5. The method of claim 4 wherein said landing pad is adapted to receive the lifting blades of a load push lift truck such that said lift truck can engage a cargo landed on said landing pad and lift it thereoff and wherein said lift truck is a load push lift truck and further comprising the steps of lifting said stack by the blades of said load push lift truck, transporting said stack to a stowage location and pushing said stack of cartons from the blades of the load push lift truck.

6. The method of claim 5 wherein said stack of cartons is transported to a position adjacent said vessel by means of an enclosed, refrigerated vehicle.

7. A method of transporting and stowing cartons of frozen animal products in a vessel, said vessel having a hold therein, wherein said cartons are initially arranged in stacks on pallets, the method comprising:

positioning a stack of cartons on a pallet proximate to said vessel, removing the pallet from said stack of cartons;

providing at least two cargo slings extending around said stack of cartons after removal of said pallets;

providing a landing pad within the hold of said vessel, said landing pad having at least two transversely extending channels in the upper surface thereof adapted to receive the cargo slings, and having dimensions sufficient to allow cargo slings to be drawn therethrough, said landing pad further including a plurality of channels formed in its upper surface of size and arrangement sufficient to receive the blades of a load push lift truck;

lifting said cartons off the landing pad using a load push lift truck having a load push mechanism associated with a plurality of cargo supporting and lifting blades by inserting the blades of said lift truck into said plurality of channels and raising said blades;

transporting said cartons to a stowage location; and depositing said cartons at the stowage location by said load push mechanism.

8. The method of claim 7 wherein a rotator is positioned alongside said vessel, and wherein said stack of cartons is lifted from the rotator into the hold of said vessel.

9. A method of transporting to and stowing stacks of cartons of refrigerated products into a vessel said vessel having a hold therein, wherein said cartons are initially arranged in stacks on pallets, the method comprising:

positioning said stack of cartons and pallet adjacent a vessel to be loaded;

rotating said stack of cartons;

removing the pallet from said stack of cartons;

providing at least two slings arranged about said stack of cartons;

lifting said stack of cartons by said slings into the cargo hold of said vessel and depositing said stack of cartons into said cargo hold;

lifting said stack by a lift truck without use of a pallet; and depositing said stack of cartons in a final stowage location by said lift truck.

10. The method of claim 9 further comprising providing a landing pad in the cargo hold of said vessel, the upper surface of said landing pad being adapted to receive said at least two slings and wherein said stack of cartons is deposited in said cargo hold onto said landing pad.

11. The method of claim 10 wherein said landing pad is adapted to receive the lifting blades of a load push lift truck such that said lift truck can engage a cargo landed on said landing pad and lift it thereof and wherein said lift truck is a load push lift truck, the method further comprising the steps of lifting said stack by the blades of said load push lift truck, transporting said stack to a stowage location and pushing said stack of cartons from the blades of the load push lift truck.

12. The method of claim 11 wherein said stack of cartons is transported to a position adjacent said vessel by an enclosed, refrigerated vehicle.

13. A method of transporting to and stowing stacks of cartons of products into a vessel said vessel having a hold therein, wherein said stacks are initially arranged on pallets, the method comprising:

positioning a stack of cartons and pallet adjacent a vessel to be loaded;

rotating said stack of cartons;

removing the pallet from said stack of cartons;

providing at least two slings arranged about said stack of cartons;

lifting said stack of cartons by said slings into the cargo hold of said vessel and depositing said stack of cartons into said cargo hold;

lifting said stack by a lift truck without use of a pallet; and depositing said stack of cartons in a final stowage location by said lift truck.

14. A method of transporting to and stowing stacks of canons into a vessel, said vessel having a hold therein accessible through a hatch, wherein said cartons are initially arranged in stacks on pallets, the method comprising:

positioning said stack of cartons and pallet adjacent a vessel to be loaded;

rotating said stack of cartons;

removing the pallet from said stack of cartons;

providing at least two slings arranged about said stack of cartons;

lifting stacks of cartons into the vessel by means of said slings; and depositing said stacks of cartons at their final stowage location in the square of the hatch by means of slings.

* * * * *

UNITED STATES PATENT AND TRADEMARK OFFICE
CERTIFICATE OF CORRECTION

PATENT NO. : 6,375,407 B1
DATED : April 23, 2002
INVENTOR(S) : W. Sam Coblentz

It is certified that error appears in the above-identified patent and that said Letters Patent is hereby corrected as shown below:

Column 1,
Line 35, reads "as follows." should read -- as follows: --

Column 2,
Line 14, reads "tie cartons" should read -- the cartons --

Column 3,
Line 25, reads "as follows." should read -- as follows: --

Column 4,
Line 66, reads "lift truck, has at least" should read -- lift truck has at least --

Column 6,
Line 41, reads "Calculations based on" should read -- Using calculations based on --

Column 8,
Lines 6-7, reads "trucks. Such lift trucks are discussed, for example," should read -- trucks. For example, --

Column 9,
Line 64, reads "by removal and or" should read -- by removal and/or --

Column 10,
Line 52, reads "and when bolts 61are" should read -- and when bolts 61 are --

Figure 11:
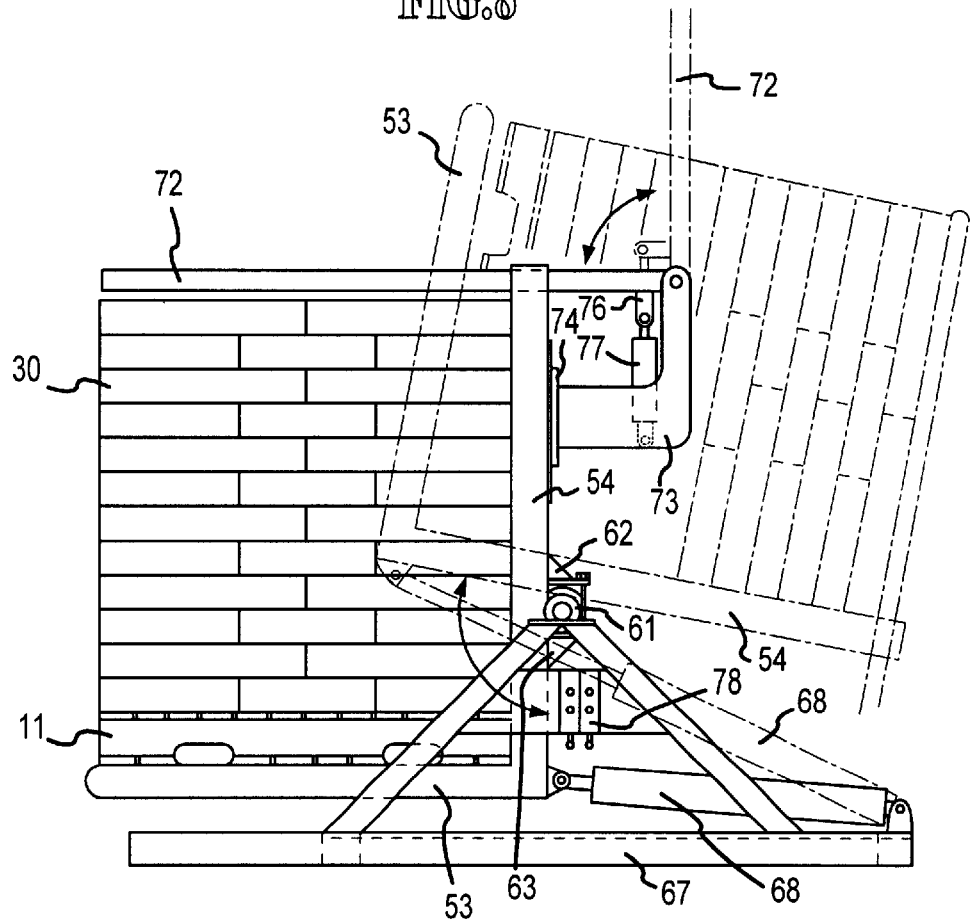
FIG. 11 is a side view of a rotator with a palletload of cartons of frozen chicken loaded aboard, showing the operation of the rotator.

Column 11,
Line 16, reads "shown in FIG. 9 and 1," should read -- shown in FIGS. 9 and 11, --
Line 53, reads "along side a ship" should read -- alongside a ship --

Column 12,
Line 23, reads "be-made" should read -- be made --
Line 58, reads "vessel said vessel" should read -- vessel, said vessel --

Column 13,
Line 32, reads "vessel," should read -- vessel; --
Line 58, reads "vessel said vessel" should read -- vessel, said vessel --

UNITED STATES PATENT AND TRADEMARK OFFICE
CERTIFICATE OF CORRECTION

PATENT NO.     : 6,375,407 B1
DATED          : April 23, 2002
INVENTOR(S)    : W. Sam Coblentz It is certified that error appears in the above-identified patent and that said Letters Patent is hereby corrected as shown below:

<u>Column 14,</u>
Line 20, reads "lift it thereof" should read -- lift it thereoff --
Line 30, reads "vessel said vessel" should read -- vessel, said vessel --

Signed and Sealed this

Thirteenth Day of May, 2003

JAMES E. ROGAN
*Director of the United States Patent and Trademark Office*